United States Patent
Tsunemi et al.

(10) Patent No.: US 6,953,421 B2
(45) Date of Patent: Oct. 11, 2005

(54) ELECTROPHOTOGRAPHY ROLLER

(75) Inventors: Hidenari Tsunemi, Hyogo (JP); Jun Kamite, Shiga (JP); Keizo Asaoka, Hyogo (JP); Kenji Kobayashi, Shiga (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/168,037

(22) PCT Filed: Dec. 13, 2000

(86) PCT No.: PCT/JP00/08797

§ 371 (c)(1),
(2), (4) Date: Jun. 13, 2002

(87) PCT Pub. No.: WO01/44877

PCT Pub. Date: Jun. 21, 2001

(65) Prior Publication Data
US 2003/0022775 A1 Jan. 30, 2003

(30) Foreign Application Priority Data
Dec. 16, 1999 (JP) .......................... H11-357445

(51) Int. Cl.$^7$ ............................................. F16C 13/00
(52) U.S. Cl. ....................................................... 492/56
(58) Field of Search ........................... 399/286; 492/59, 492/53, 56, 48, 49

(56) References Cited

U.S. PATENT DOCUMENTS

| | | | |
|---|---|---|---|
| 5,089,851 A | * | 2/1992 | Tanaka et al. ............. 399/176 |
| 5,732,314 A | * | 3/1998 | Tsukida et al. ............. 399/302 |
| 5,745,816 A | * | 4/1998 | Verlinden et al. ........... 492/50 |
| 5,810,705 A | * | 9/1998 | Mimura et al. ............. 492/56 |
| 5,922,426 A | * | 7/1999 | Nagatsuka et al. .......... 492/56 |
| 6,035,172 A | * | 3/2000 | Mimura et al. ............. 399/286 |
| 6,067,434 A | * | 5/2000 | Takagi et al. .............. 492/56 |
| 6,360,069 B1 | * | 3/2002 | Mimura et al. ............. 399/286 |

FOREIGN PATENT DOCUMENTS

| | | |
|---|---|---|
| JP | 6-167900 | 6/1994 |
| JP | 9-114190 | 5/1997 |
| JP | 9-292754 | 11/1997 |
| JP | 10-3210 | 1/1998 |
| JP | 11-038751 | * 2/1999 |
| WO | WO99/01800 | * 1/1999 |

OTHER PUBLICATIONS

MatWeb.com, The Online Materials Database Data Sheet, www.matweb.com/search/.*

* cited by examiner

Primary Examiner—Marc Jimenez
(74) Attorney, Agent, or Firm—Brinks Hofer Gilson & Lione

(57) ABSTRACT

An electrophotography roller incorporated in an image creating device by the electrophotography comprising a conductive shaft disposed along the center axis, a conductive elastic layer around the shaft, a surface layer on the conductive elastic layer formed concentrically. The JIS A hardness of the conductive elastic layer is 30° or less. The shear modulus of the conductive elastic layer measured in viscoelasticity under the condition of 20° C., 60% PH and 0.1 Hz is 4 $10^5$ Pa or more. The width of contact of the roller with another member is sufficiently ensured even under a low pressing pressure. The compression residual strain is small even after the roller is pressed against another member for a long time. If the roller is used as a development roller, a sharp image with less density unevenness due to the residual strain is created.

3 Claims, 2 Drawing Sheets

ELECTROPHOTOGRAPHY ROLLER

This application is a nationalization of PCT application PCT/JP00/08797 filed Dec. 13, 2000. This application claims priority from the PCT application and Japan Application Serial No. H11(1999)-357445 filed Dec. 16, 1999.

TECHNICAL FIELD

This invention relates to a roller that is part of an imaging device that features electrophotography, such as a copy machine, printer, or a fax machine.

BACKGROUND ART

With an electrophotographic imaging device, various rollers are disposed in the vicinity of an electrostatic latent image support, such as a charging roller for uniformly supplying an electric charge to this electrostatic latent image support, a developing roller for supplying toner to the electrostatic latent image support, and a transfer roller for transferring the toner image from the surface of the electrostatic latent image support onto recording paper.

FIG. 1 is a diagram illustrating an example of such an electrophotographic imaging device. A charging roller 20 rotates with its surface in contact with a photosensitive element 21 (an electrostatic latent image support), and uniformly supplies an electric charge to the surface of the photosensitive element 21. A photoconductive insulator layer is formed on the surface of the photosensitive element 21, and a conductor layer is formed under this photoconductive insulator layer. An electrostatic latent image is formed when light 22 including image information strikes the surface of the photosensitive element 21. A developer 23 makes this electrostatic latent image visible.

The developer 23 comprises a toner container 25 in which toner 24 is stored, a regulator blade 26 provided to this toner container 25, a developing roller 27, a supply roller 28 for securely supporting the toner 24 on the surface of this developing roller 27, etc. The developing roller 27 comprises a conductive elastic layer concentrically provided around a conductive shaft made of SUS, an aluminum alloy, or the like, and in some cases this conductive elastic layer is covered with a protective layer (surface layer). Voltage is applied between this conductive shaft and the surface of the developing roller. The toner 24 inside the toner container 25 consists of a non-magnetic toner, is held on the surface of the developing roller 27, and is charged by contact/friction when made into a thin toner layer by the regulator blade 26. When the surface of the developing roller 27 is brought into contact with the surface of the photosensitive element 21, the thin toner layer adheres to the electrostatic latent image on the photosensitive element 21 surface, forming a toner image on the surface of the photosensitive element 21. This toner image is electrostatically adsorbed to the surface of recording paper 30 by a transfer roller 29, producing a transfer image on the recording paper 30. This transfer image is fixed to the recording paper 30 by a heating roller 31 and a pressing roller 32. A blade or other cleaner 33 is provided on the downstream side of the transfer roller 29 in order to remove any toner powder that is not transferred and remains on the surface of the photosensitive element 21. A brush or roller is sometimes used instead of this blade.

Of the various rollers used in the above-mentioned electrophotography imaging device, the charging roller, developing roller, and transfer roller all have the same basic structure. Specifically, these rollers are configured such that a conductive elastic layer is formed around a conductive shaft, and in some cases a protective layer (surface layer) covers this conductive elastic layer. This conductive elastic layer needs to allow suitable elastic deformation. For instance, in the case of a charging roller, for the charge on its surface to be supplied to the photosensitive element, there needs to be a certain contact width in the peripheral direction between the charging roller and the photosensitive element. A low-hardness roller is used for the charging roller in order to ensure the proper contact width. In the case of a developing roller, the correct contact width in the peripheral direction is required between the developing roller and the photosensitive element in order for the toner held on the surface of the developing roller to adhere efficiently to the photosensitive element. Technology has been introduced in which a low-hardness developing roller is used in order to reduce the stress on the toner and ensure the proper contact width. In the case of a transfer roller, the required reproduced image can be obtained by electrostatically transferring the toner image to a recording medium (such as recording paper), either directly or via an intermediate transfer element, but ensuring the appropriate contact width in the peripheral direction is important in order to raise the transfer efficiency, so a low-hardness roller is again used.

To achieve the desired deformation, NBR (nitrile butadiene rubber), urethane, EPDM (ethylene propylene rubber), silicone, or another such rubber is frequently used as the material for the conductive elastic layer of the various rollers discussed above. The use of low-hardness rollers has been increasing in an effort to improve the quality of reproduced images and lessen toner stress. This low hardness can be achieved by foaming the rubber layer to reduce its hardness, or by lowering the crosslink density, but a problem with such rollers is that when a printer or copy machine is started up after not being used for an extended period, strain remains in the rollers, which can lead to voids, uneven density, and so forth in the toner image or reproduced image. This happens because the rollers are fixed for an extended period in a state in which they are pressed against the photosensitive element, intermediate transfer element, or other members, so residual compression strain remains.

The inventors conducted diligent research in light of these problems, and as a result perfected a roller that has low enough hardness to ensure the proper contact width in the peripheral direction between the roller and other members even at a low pressing force, and that has little residual compression strain even when left compressed in a state in which it is pressed against another member for an extended period.

DISCLOSURE OF THE INVENTION

The inventors conducted diligent research aimed at solving the above problems, and as a result arrived at the present invention upon turning their attention to the hardness and elastic modulus of the conductive elastic layer of a roller. Specifically, the inventors discovered that, with a roller in which a conductive shaft is disposed along a center axis, a conductive elastic layer is provided concentrically around said conductive shaft, and a surface layer is formed concentrically over said conductive elastic layer, if the conductive elastic layer has a JIS A hardness of no more than 30°, and the shear modulus of the conductive elastic layer, measured as the viscoelasticity at 0.1 Hz in an environment of 20° C. and 60% RH, is at least $4 \times 10^5$ Pa, then the proper contact width in the peripheral direction can be ensured between the roller and other members even at a low pressing force, and there will be little residual compression strain in the roller even when it has been compressed and fixed in a state of being pressed against another member for an extended period.

The roller of the present invention is preferably designed such that the roller resistance prior to the formation of the surface layer, that is, at the stage when only the conductive elastic layer has been formed around the conductive shaft, is at least $10^3$ Ωcm, and the roller resistance after the formation of the surface layer is $10^4$ to $10^{10}$ Ωcm. The reason for this is that the usable range of resistance for the developing roller, charging roller, and transfer roller built into an electrophotographic imaging device is the above-mentioned $10^4$ to $10^{10}$ Ωcm. The term "roller resistance" as used in the present invention is the value measured by applying a DC voltage of 100 V between the conductive shaft and a metal plate when a load of 500 g is applied to each end of the shaft in the metal plate direction.

It is particularly favorable for the conductive elastic layer to be a reaction product of a curable composition whose main components are (A) a polymer that contains at least one alkenyl group in its molecule, and in which the repeating units that make up the main chain consist mainly of oxyalkylene units, and/or a polymer composed of saturated hydrocarbon-based units, (B) a curing agent that contains at least two hydrosilyl groups in its molecule, (C) a hydrosilylation catalyst, and (D) a conductivity imparter.

It is preferable for the main component of the surface layer to be either a single resin selected from the group consisting of urethane resins, acrylic resins, silicone resins, and fluororesins, or a blend of these resins.

Furthermore, it is preferable for the material of which the surface layer is made to have an elongation of at least 300%. An elongation between 300% and 600% is particularly good, and a range of 400% to 600% is even better. The term "elongation" as used in the present invention is the elongation at break as measured according to JIS K 6251.

The electrophotography roller pertaining to the present invention can be used as a charging roller or transfer roller built into an electrophotographic imaging device, a developing roller built into a developing device that supplies toner to an electrostatic latent image support, or the like.

Various working examples that are representative of the roller pertaining to the present invention will now be described through reference to the drawings. FIG. 2 is a diagram schematically illustrating a developing roller 1, which is an example of the electrophotography roller pertaining to the present invention, and its surrounding structure. The developing roller 1 pertaining to the present invention comprises a conductive elastic layer 3 concentrically provided around a conductive shaft 2 having a diameter of about 1 mm to 25 mm and made of SUS, an aluminum alloy, conductive resin or the like, and the outer peripheral surface of this conductive elastic layer 3 is covered with a surface layer 4 in a specific thickness between 10 and 50 μm. The conductive elastic layer 3 has a JIS A hardness of no more than 30°, and its shear modulus, measured as the viscoelasticity at 0.1 Hz in an environment of 20° C. and 60% RH, is at least $4\times10^5$ Pa. The surface layer 4 preferably has an elongation at break (measured according to JIS K 6251) of at least 300%, and it is even better if the elongation of the surface layer 4 is at least 400%. A resistance adjusting layer for adjusting the electrical resistance of the developing roller 1 may in some cases be provided between the conductive elastic layer 3 and the surface layer 4, and one or more primer layers may also be included for increasing the adhesion between the conductive elastic layer 3 and the surface layer 4. The surface layer 4 can be formed by dipping, spraying, roll coating, brush coating, or another such method as dictated by the viscosity of the resin component that makes up the surface layer 4, for example, but there are no particular restrictions on how this surface layer 4 is formed in the present invention.

Non-magnetic toner 6 stored in a toner container 5 is supported on the surface of the developing roller 1 and made into a toner thin film 8 of a specific thickness by a regulator blade 7, after which the toner thin film 8, which has been friction charged in the course of being made into the toner thin film 8 by this regulator blade 7, adheres to an electrostatic latent image on the surface of a photosensitive element 9. The non-magnetic toner 6 is efficiently supplied to the developing roller 1 here by a supply roller 10. The supply roller 10 can be in the form of a sponge, such as a conductive foam composed of polyurethane or the like, or it can be a conductor such as a metal pipe composed of aluminum or the like. The non-magnetic toner 6 can comprise a coloring pigment covered with a styrene-acrylic-based or polyester-based thermoplastic resin or the like, and has a particle diameter of about 6 to 10 μm, for example.

In this example, DC voltage is applied to the developing roller 1 and the supply roller 10. If the toner 6 is negatively charged, it is preferable to apply a DC voltage of −150 to −350 V to the developing roller 1 and −200 to −600 V to the supply roller 10. A DC voltage of −150 to −600 V can also be applied to the regulator blade 7 in order to control the charge of the toner 6. If the toner 6 is positively charged, then the DC voltages applied to the developing roller 1, the supply roller 10, and the regulator blade 7 will be of the opposite sign, but of the same absolute values as above. AC voltage can also be superposed over the DC voltage.

It is preferable for the conductive elastic layer 3 to have a roller resistance of at least $10^4$ Ω before being covered with the surface layer 4. This is because when a DC voltage is applied to the developing roller 1, fluctuation in roller resistance can be kept low in the event that there is any coating unevenness of the surface layer 4. Furthermore, the roller resistance after being covered by the surface layer 4 should be $10^4$ to $10^{10}$ Ω, and preferably between $10^5$ and $10^9$ Ω, so that the photosensitive element 9 will not be damaged and a good image will be obtained.

During developing, the surface of the developing roller 1 rotates axially while being pressed against the surface of the photosensitive element 9 at a specific contact width in the peripheral direction (hereinafter referred to as the nip width). The nip width must be about 0.5 to 2.0 mm. Thus, during developing, the surface of the developing roller 1 rotates axially while its pressing location on the photosensitive element 9 varies in the peripheral direction. The result of using the developing roller 1 pertaining to the present invention, that is, a roller comprising a conductive elastic layer concentrically provided around the conductive shaft 2, and the surface layer 4 concentrically provided around over this conductive elastic layer 3, wherein the conductive elastic layer 3 has a JIS A hardness of no more than 30°, and the shear modulus of the conductive elastic layer, measured as the viscoelasticity at 0.1 Hz in an environment of 20° C. and 60% RH, is at least $4\times10^5$ Pa, is that the proper nip width at the photosensitive element 9 can be ensured at a low pressing force, and there is less residual strain in the conductive elastic layer 3 after the layer 3 has been pressed against the photosensitive element 9, the regulator blade 7, or the like for an extended period, which makes it possible to obtain a sharp image with no voids, toner density unevenness, or the like immediately after the developing device is started up. When a reduction in toner stress is taken into account, it is preferable for the JIS A hardness of the conductive elastic layer 3 to be no more than 25°. Also, in terms of the level of compression strain, it is preferable for the shear modulus of the conductive elastic layer 3 to be at least 4.5×10⁵ Pa.

The structure of the conductive elastic layer of the roller pertaining to the present invention will now be described in detail.

Urethane rubber, silicone rubber, or other such liquid rubber can be used as the material for the conductive elastic layer with a JIS A hardness of no more than 300 and a shear modulus of at least 4×10⁵ Pa measured as the viscoelasticity at 0.1 Hz in an environment of 20° C. and 60% RH, but a crosslinked rubber produced by the hydrosilylation of a liquid rubber (discussed below) is particularly favorable because it has a flexible structure. Specifically, it is preferable to use a reaction product of a curable composition whose main components are (A) a polymer that contains at least one alkenyl group in its molecule, and in which the repeating units that make up the main chain consist mainly of oxyalkylene units, and/or a polymer composed of saturated hydrocarbon-based units, (B) a curing agent that contains at least two hydrosilyl groups in its molecule, (C) a hydrosilylation catalyst, and (D) a conductivity imparter. If the polymer of component A includes oxyalkylene groups, the uncured composition will be easier to handle because of its lower viscosity, and it is favorable for the polymer of component A to include saturated hydrocarbon units because the conductive elastic layer after curing will have a lower moisture absorption rate, so there will be less change in the roller resistance in high humidity environments.

The polymer of component A in this curable composition cures through a hydrosilylation reaction with component B, and has at least one alkenyl group in its molecule, and therefore becomes macromolecular and cures when the hydrosilylation reaction occurs. The number of alkenyl groups included in component A must be at least one from the standpoint of the hydrosilylation reaction with component B, but from the standpoint of rubber elasticity, it is preferable for two alkenyl groups to be present at the ends of the molecule in the case of a straight chain molecule, and for two or more alkenyl groups to be present at the molecular ends in the case of a branched molecule.

The main repeating units that make up the main chain of component A are oxyalkylene units and/or saturated hydrocarbon units.

When component A is a polymer in which the main repeating units that make up the main chain consist of oxyalkylene units, only a small amount of conductivity imparter need be added because the volumetric resistivity of the cured product will be from 10⁸ to 10⁹ Ωcm. From the standpoint of the cured product having low hardness, the above-mentioned oxyalkylene-based polymer in which the repeating units are oxyalkylene units is preferable, and particularly an oxypropylene-based polymer in which the repeating units are oxypropylene units.

The term "oxyalkylene-based polymer" as used here means a polymer in which at least 30%, and preferably at least 50%, of the units that make up the main chain consist of oxyalkylene units. Examples of units other than oxyalkylene units that may be contained include compounds having two or more active hydrogens, such as ethylene glycol, bisphenol compounds, glycerol, trimethylolpropane, pentaerythritol, and other such units. In the case of an oxypropylene-based polymer, this may also be a copolymer with units consisting of ethylene oxide, butylene oxide, or the like (including graft copolymers).

From the standpoint of striking a good balance between reactivity and reduction of the hardness of the cured product, it is preferable for the molecular weight of the oxyalkylene-based polymer of component A to be from 500 to 50,000, and even more preferably 1000 to 40,000, as the number average molecular weight Mn. A number average molecular weight Mn of 5000 or higher is especially good, and a range of 5000 to 40,000 is best. If the number average molecular weight Mn of the oxyalkylene-based polymer of component A is less than 500, then it will be difficult to obtain adequate mechanical strength (rubber hardness and elongation) and so forth when this curable composition is cured. On the other hand, if the number average molecular weight Mn of the oxyalkylene-based polymer of component A is too high, the molecular weight per alkenyl group included in each molecule will be too high, or reactivity will suffer due to steric hindrance, so curing will usually be insufficient, and furthermore the viscoelasticity will be too high, which tends to result in poor workability.

There are no particular restrictions on the alkenyl groups of the above-mentioned oxyalkylene-based polymer, but those expressed by the following General Formula 1 are preferred in terms of curability.

$$H_2C=C(R^1)-\qquad(1)$$

(In the formula, R¹ is a hydrogen atom or methyl group.)

One of the advantages of this curable composition is that it is easy to achieve low hardness in the cured product, and for this to be fully realized, it is preferable for there to be at least two alkenyl groups at the molecule ends. Still, if there are too many alkenyl groups with respect to the molecular weight of component A, the product will be stiff, and it will be difficult to obtain good rubber elasticity.

If component A is a polymer in which the main repeating units that make up the main chain consist of saturated hydrocarbon-based units, this is favorable because the cured product will have low moisture absorption, and there will be little fluctuation in electrical resistance in different environments. This polymer, just as with the above-mentioned oxyalkylene-based polymer, cures through a hydrosilylation reaction with component B, and has at least one alkenyl group in its molecule, and therefore becomes macromolecular and cures when the hydrosilylation reaction occurs. The number of alkenyl groups included in the molecules of the saturated hydrocarbon-based polymer of component A must be at least one from the standpoint of the hydrosilylation reaction with component B, but from the standpoint of rubber elasticity, it is preferable for two alkenyl groups to be present at the ends of the molecule in the case of a straight chain molecule, and for two or more alkenyl groups to be present at the molecular ends in the case of a branched molecule.

Typical examples of a polymer in which the main repeating units that make up the main chain are saturated hydrocarbon units include isobutylene-based polymers, hydrogenated isobutylene-based polymers, and hydrogenated butadiene-based polymers. These polymers may include repeating units of other components, such as in a copolymer, but it is important that at least 50%, and preferably at least 70%, and even more preferably at least 90%, of the units be saturated hydrocarbon units so as not to lose the advantage of low moisture absorption afforded by a saturated hydrocarbon-based polymer.

From the standpoint of ease of handling, the polymer of component A in which the main repeating units that make up the main chain are saturated hydrocarbon units should have a number average molecular weight Mn of about 500 to 50,000, and preferably about 1000 to 15,000, and it is best in terms of workability for the polymer to have good fluidity in liquid form at normal temperature.

The alkenyl groups introduced into this saturated hydrocarbon-based polymer are the same as with the above-mentioned oxyalkylene-based polymer.

Therefore, as for component A, specific favorable examples of polymers that have at least one alkenyl group in their molecule, and in which the main repeating units that make up the main chain are saturated hydrocarbon units, include straight-chain polyisobutylene-based polymers that have two alkenyl groups at the molecule ends, have a number average molecular weight Mn of 2000 to 15,000, and have an Mw/Mn (weight average molecular weight)/(number average molecular weight) ratio of 1.1 to 1.2, as well as hydrogenated butadiene-based and hydrogenated polyisoprene-based polymers with a number average molecular weight Mn of about 1000 to 5000.

There are no restrictions on the compound having hydrosilyl groups that is used as component B, as long as it contains at least two silicon-bonded hydrogen atoms in its molecule. The term "hydrosilyl group" here refers to a group having an Si—H bond, but in the present invention, when two hydrogen atoms (H) are bonded to the same silicon atom (Si), this is counted as two hydrosilyl groups. If there are too many hydrosilyl groups in the molecule of component B, they will tend to remind in the cured product, where they will cause voids and cracks, so the molecule of component B should include no more than 50 hydrosilyl groups. From the standpoints of storage stability and controlling the rubber elasticity of the cured product, the number of hydrosilyl groups in the molecules of component B should be from 2 to 40, and preferably from 2 to 30, and from the standpoint of easily preventing foaming during curing, there should be no more than 30, and preferably three in terms of making it less likely that incomplete curing will result from deactivation of the hydrosilyl groups. The optimal range is from 3 to 30. Curability will be better if the hydrogens are each bonded to a different silicon, and this is also desirable in terms of the rubber elasticity of the cured product.

The number average molecular weight Mn of component B should be no higher than 30,000 from the standpoints of roller workability, dispersibility when the conductivity imparter (component D; discussed below) is added, and so forth, with 20,000 or lower being preferable, and 15,000 or lower being particularly good. When reactivity and miscibility with component A are taken into account, the number average molecular weight Mn of component B should be 300 to 10,000.

A specific favorable example of component B is a polyorganohydrogensiloxane. "Polyorganohydrogensiloxane" as used here refers to a siloxane compound having a hydrocarbon group or hydrogen atom on a silicon atom. This can be either linear or cyclic. As to the specific structure thereof, chain-form and cyclic compounds are expressed by the following General Formulas 2 to 4.

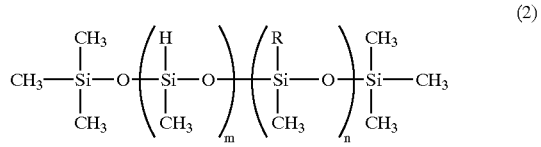

(2)

(In the formula, $2 \leq m+n \leq 50$, $2 \leq m$, $0 \leq n$, and R is hydrocarbon in which the number of carbons in the main chain is 2 to 20, and may include one or more phenyl groups.)

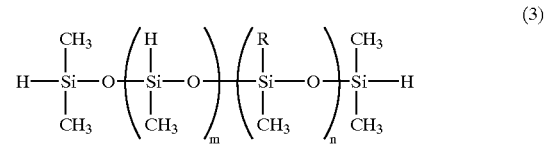

(3)

(In the formula, $0 < m+n \leq 50$, $0 < m$, $0 \leq n$, and R is hydrocarbon in which the number of carbons in the main chain is 2 to 20, and may include one or more phenyl groups.)

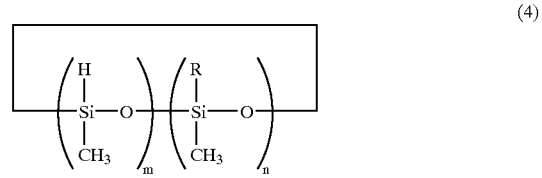

(4)

(In the formula, $3 \leq m+n \leq 20$, $2 < m \leq 19$, $0$ $n < 18$, and R is hydrocarbon in which the number of carbons in the main chain is 2 to 20, and may include one or more phenyl groups.)

Examples of compounds that have two or more of these units include those expressed by the following General Formulas 5 to 7.

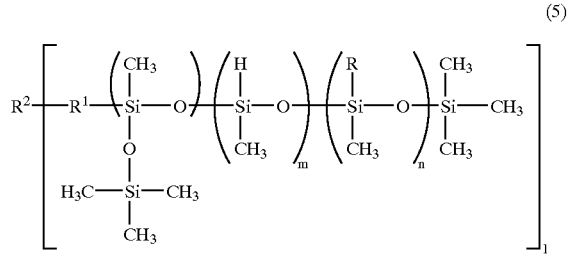

(5)

(In the formula, $1 \leq m+n \leq 50$, $1 \leq m$, $0 \leq n$, and R is hydrocarbon in which the number of carbons in the main chain is 2 to 20, and may include One or more phenyl groups. $2 \leq 1$, $R^2$ is a divalent to tetravalent organic group, and $R^1$ is a divalent organic group. Depending on the structure of $R^2$, $R^1$ may not be needed.)

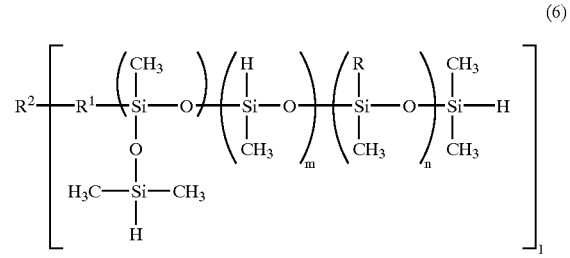

(6)

(In the formula, $0 \leq m+n \leq 50$, $0 \leq m$, $0 \leq n$, and R is hydrocarbon in which the number of carbons in the main chain is 2 to 20, and may include one or more phenyl groups. $2 \leq 1$, $R^2$ is a divalent to tetravalent organic group, and $R^1$ is a divalent organic group. Depending on the structure of $R^2$, $R^1$ may not be needed.)

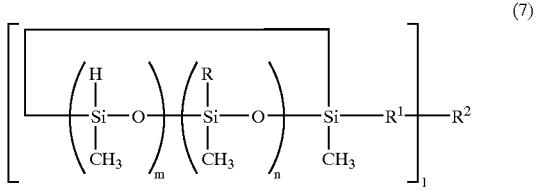

(7)

(In the formula, $3 \leq m+n \leq 50$, $1 \leq m$, $0 \leq n$, and R is hydrocarbon in which the number of carbons in the main chain is 2 to 20, and may include one or more phenyl groups. $2 \leq 1$, $R^2$ is a divalent to tetravalent organic group, and $R^1$ is a divalent organic group. Depending on the structure of $R^2$, $R^1$ may not be needed.)

Component B should be one that has good miscibility with component A and with components C and D, or has good dispersion stability in the system. In particular, when the viscosity of the entire system is low, phase separation may occur and curing may be incomplete if component B does not have enough miscibility with the above components. Regarding this component B, it is preferable for aryl groups, alkyl groups, polyoxyalkylene groups, or the like to be contained in order to improve the miscibility with component A. A styrene-modified or alkyl group-modified compound is preferred in terms of being readily available, while an α-methylstyrene-modified compound is preferred in terms of storage stability.

For the sake of rubber elasticity, the proportion in which component A and component B are used in the curable composition should be such that component B contains 0.2 to 5.0 mol, and preferably 0.4 to 2.5 mol, of hydrosilyl groups per mole of alkenyl groups in component A. The hardness and shear modulus of the conductive elastic layer can be controlled by varying the combination of the polymer of component A and the curing agent of component B. Specifically, if a curing agent containing many hydrosilyl groups per molecule is used as component B, the hardness and shear modulus of the conductive elastic layer will be high, and conversely, if one with few hydrosilyl groups per molecule is used, the hardness and shear modulus of the conductive elastic layer will be low.

Next, there are no particular restrictions on the hydrosilylation catalyst used as component C, as long as it can function as a hydrosilylation catalyst, but examples include platinum by itself, solid platinum supported on alumina or another such carrier, chloroplatinic acid (including complexes of alcohols and so on), various complexes of platinum, and chlorides of metals such as rhodium, ruthenium, iron, aluminum, and titanium. Of these, chloroplatinic acid, platinum-olefin complexes, and platinum-vinylsiloxane complexes are preferred for their catalytic activity. These catalysts may be used singly, or two or more may be used together.

The amount in which component C is used should be $10^{-1}$ to $10^{-8}$ mol, and preferably $10^{-1}$ to $10^{-6}$ mol, and particularly $10^{-3}$ to $10^{-6}$ mol, per mole of alkenyl groups in component A. The reaction will not proceed if component C is used in an amount less than $10^{-8}$ mol per mole of alkenyl groups in component A. On the other hand, hydrosilylation catalysts are generally expensive, and are also corrosive, and furthermore they generate large quantities of hydrogen gas causes the cured product to foam, so the catalyst is preferably not used in an amount over $10^{-1}$ mol per mole of alkenyl groups in component A.

A conductivity imparter may also be added as component D to the above-mentioned curable composition to make it into a conductive composition, which is desirable for use as a developing roller, charging roller, or transfer roller. Examples of the conductivity imparter of component D include compounds able to impart conductivity, such as carbon black, metal fines, metal oxides, organic compounds or polymers having quaternary ammonium salt groups, carboxylic acid groups, sulfonic acid groups, sulfuric ester groups, phosphoric ester groups, or the like, and compounds or macromolecular compounds having conductive units, typified by ether ester amide or ether imide polymers, ethylene oxide-epihalohydrin copolymers, methoxypolyethylene glycol acrylate, and so on, and other such antistatic agents. These conductivity imparters may be used singly, or two or more types may be used together.

The amount in which the conductivity imparter of component D is added should be no more than 30 wt % with respect to the combined weight of components A to C so as not to increase the rubber hardness of the cured product. On the other hand, this amount should be at least 10 wt % in order to obtain uniform resistance. The added amount should be determined so as to strike a good balance between the required rubber hardness and obtaining a cured product with a volumetric resistivity of $10^3$ to $10^{10}$ Ωcm.

In addition to the above-mentioned components A to D, a storage stability enhancer may also be added to the above-mentioned curable composition. Any ordinary stabilizer known as a storage stabilizer for component B can be used as a storage stability enhancer, and there are no particular restrictions thereon as long as the intended objective can be achieved. More specifically, compounds containing aliphatic unsaturated bonds, organic phosphorus compounds, organic sulfur compounds, nitrogen compounds, tin compounds, organic peroxides, and so forth can be used to advantage. Specific examples include 2-benzothiazolyl sulfide, benzothiazole, thiazole, dimethylacetylene dicarboxylate, diethylacetylene dicarboxylate, butylhydroxytoluene, butylhydroxyanisole, vitamin E, 2-(4-morphodinyldithio) benzothiazole, 3-methyl-1-buten-3-ol, acetylenic unsaturated group-containing organosiloxanes, ethylenic unsaturated group-containing organosiloxanes, 3-methyl-1-butyn-3-ol, 3,5-dimethyl-1-hexyn-3-ol, 1-ethynyl-1-cyclohexanol, diallyl fumarate, diallyl maleate, diethyl fumarate, diethyl maleate, dimethyl maleate, 2-pentenenitrile, and 2,3-dicyclopropene, although this list is not meant to be comprehensive. The above-mentioned storage stability enhancers may be used singly, or two or more types may be used together.

Fillers, storage stabilizers, plasticizers, UV absorbents, lubricants, pigments, and so on may also be added to the above-mentioned curable composition in order to improve workability or lower the cost.

The conductive elastic layer can be obtained by forming a rubber layer around the above-mentioned conductive shaft by introducing the above-mentioned curable composition, urethane rubber, silicone rubber, or another such elastic material by casting, injection molding, extrusion molding, or the like into a mold in the center of which a conductive shaft made of SUS, an aluminum alloy, or the like has been installed, and then heating and curing the material for a suitable time at a suitable temperature. In this case, the rubber layer formed around the conductive shaft may first be semi-cured and then post-cured.

The roller pertaining to the present invention is obtained by coating the above-mentioned conductive elastic layer with a resin that makes up the surface layer, in a specific thickness, by dipping, spraying, roll coating, brush coating, or another such method, and then drying and curing this coating at a specific temperature.

The structure of the above-mentioned surface layer in the roller pertaining to the present invention will now be described. This surface resin layer should have an elongation of at least 300%, and preferably at least 400%, and the improvement in the density unevenness of the toner image will be particularly pronounced if the elongation is between 400% and 600%. If the elongation of this surface resin layer is over 600%, though, toner filming will tend to occur because of the greater tackiness of the resin layer, and the components contained in the resin layer will tend to bleed out and soil the photosensitive element and other surrounding members. From the standpoint of suppressing the tackiness of the toner, a thermoplastic elastomer or thermosetting elastomer is preferred as the material for the surface layer. A urethane resin, fluororesin, acrylic resin, silicone resin, or the like can be used as the main component of the surface layer of the electrophotography roller. In the case of a developing roller, a fluororesin is particularly favorable from the standpoints of wear resistance, moisture absorption, and friction charging because the toner is negatively charged.

The urethane resin can be a polycarbonate urethane, polyether urethane, polyester urethane, and so on. Not only are urethane resins readily available, but when they are diluted with a solvent, they can be easily applied over the conductive elastic layer by dipping, spraying, roll coating, and so forth. Aqueous dispersions of these are also readily available.

A polycarbonate urethane is a compound obtained by reacting a polycarbonate polyol with a polyisocyanate. A polycarbonate polyol is a known material obtained by condensing a polyhydric alcohol with phosgene, a chloroformic ester, a dialkyl carbonate, or diallyl carbonate. 1,6-hexanediol, 1,4-butanediol, 1,3-butanediol, 1,5-pentanediol, and so forth are used as the polyhydric alcohol in a favorable polycarbonate polyol, and the number average molecular weight Mn thereof is preferably about 300 to 15,000. If the diol component is a polyether polyol, the product will be a polyether urethane, and if it is a polyester polyol, a polyester urethane will result. These urethane materials may be used singly or in combinations.

A known polyisocyanate can be reacted with the various urethane raw material polyols, such as tolylene diisocyanate (TDI), 4,4'-diphenylmethane diisocyanate (MDI), xylene diisocyanate (XDI), hexamethylene diisocyanate (HDI), hydrogenated TDI, hydrogenated MDI, and isophorone diisocyanate (IPDI). Hydrogenated MDI and IPDI are preferable in their balance between ready availability and low cost.

This polyurethane can be manufactured by reacting the urethane raw materials (a polyol and a polyisocyanate) in the presence or absence of a suitable solvent, using a chain extender as needed. Any known chain extender can be used for this purpose, such as an aliphatic polyamine or an aromatic polyamine. Various urethane materials modified with silicone can also be used. When used for the surface layer, the polyurethane should be used along with a blocked isocyanate or other such crosslinking agent.

A soft fluororesin is preferable as the fluororesin. Examples include ternary copolymers of tetrafluoroethylene, hexafluoropropylene, and vinylidene fluoride, and fluororubbers.

The acrylic resin can be an acrylic rubber, urethane-modified acrylic resin, silicone-modified acrylic resin, or the like.

The silicone resin can be a condensed or adduct type of dimethylsilicone resin or the like.

The electrophotography roller pertaining to the present invention was described above primarily using a developing roller as an example, but the roller of the present invention is not limited to a developing roller, and can also be applied to charging rollers, transfer rollers, and so forth.

BEST MODE FOR CARRYING OUT THE INVENTION

Figure 1:
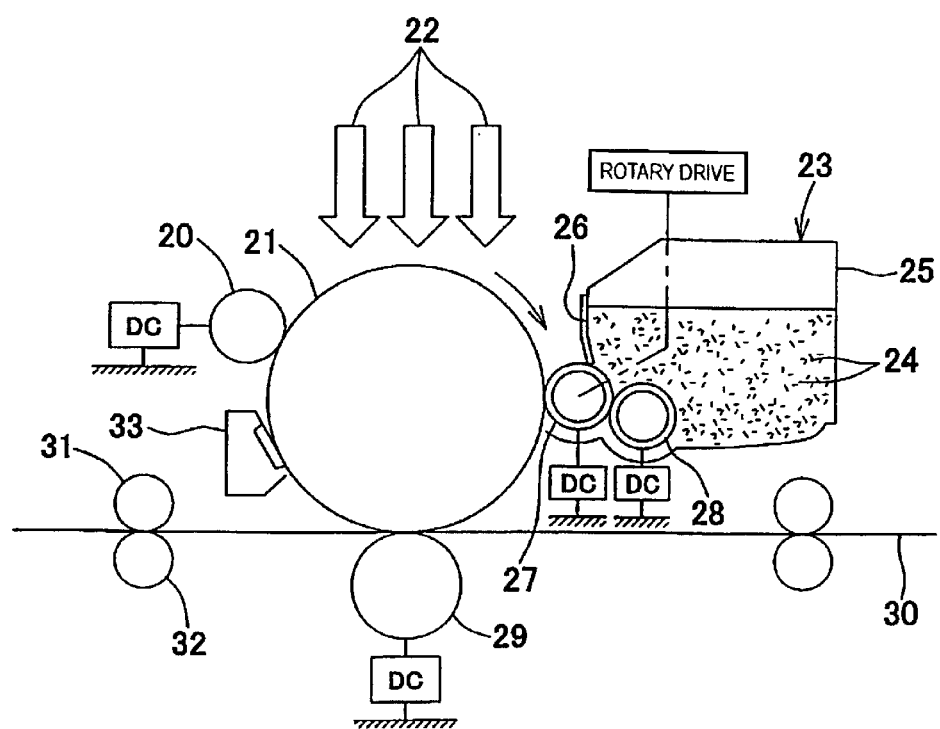
FIG. 1 is a diagram illustrating an example of an electrophotographic device.
Figure 2:
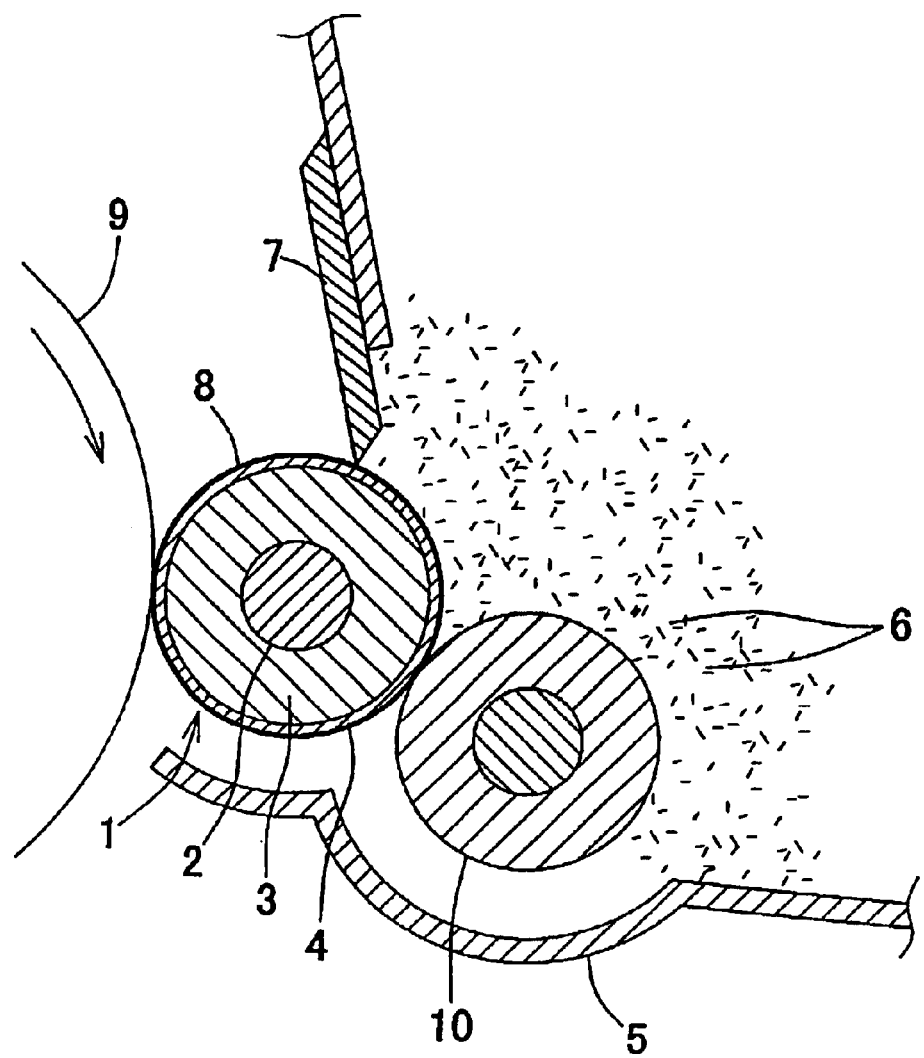
FIG. 2 is a diagram schematically illustrating a developing roller, which is an example of the electrophotography roller pertaining to the present invention, and its surrounding structure.

Examples 1 to 5 and Comparative Examples 1 and 2, which are specific examples of a developing roller, will now be described in detail as embodiments of the electrophotography roller pertaining to the present invention, after which the differences between the examples and the comparative examples will be discussed.

The developing rollers in Examples 1 to 5 and Comparative Examples 1 and 2 are configured such that a conductive elastic layer is provided around an SUS shaft with a diameter of 10 mm, and the outer peripheral surface of this conductive elastic layer is covered with a surface layer. The specific structures of the conductive elastic layer and surface layer will be discussed below.

One of the elastic layers 1 to 7 is used as the conductive elastic layer.

Elastic Layer 1

100 weight parts of (A-1) an allyl-terminated oxypropylene polymer (allyl group content: 0.233 mmol/g) with a number average molecular weight Mn of 8500 and a molecular weight distribution of 2 was mixed with (B-1) 5 weight parts of a polysiloxane-based curing agent 1 (SiH content: 3.9 mmol/g) expressed by the following Formula 8,

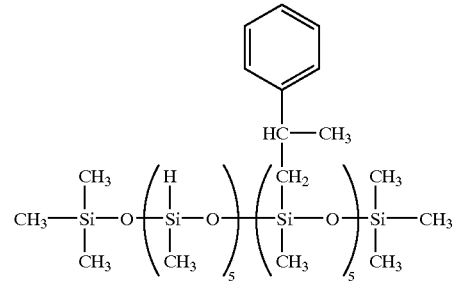

(8)

(C-1) 0.06 weight part of a 10% isopropyl alcohol solution of chloroplatinic acid, (D-1) 10 weight parts carbon black 3030B (made by Mitsubishi Chemical), and 0.04 weight part dimethyl maleate (used as a curing retarder). This mixture was defoamed under reduced pressure (120 minutes at 10 mmHg), and the composition thus obtained was used to cover the above-mentioned shaft. This product was cured by being left for 30 minutes in a 140° C. mold, which produced an elastic layer 1 with a thickness of approximately 5 mm. Also, the same composition as above was packed into an aluminum mold frame that had a thickness of 5 mm and had been lined with a Teflon sheet, after which this mold frame was sandwiched between the hot plates of a pressing machine, and hot press molding was performed for 30 minutes at 140° C., which yielded an evaluational cured sheet with a thickness of 5 mm. The JIS A hardness of this elastic layer 1 sheet (as measured according to the method of JIS K 6301 A) was 11°, and the shear modulus (measured as viscoelasticity at 0.1 Hz) was 4.8×10⁵ Pa.

Elastic Layer 2

100 weight parts of (A-1) an allyl-terminated oxypropylene polymer (allyl group content: 0.233 mmol/g) with a number average molecular weight Mn of 8500 and a molecular weight distribution of 2 was mixed with (B-2) 3.0 weight parts of a polysiloxane-based curing agent 2 (SiH content: 7.9 mmol/g) expressed by the following Formula 9,

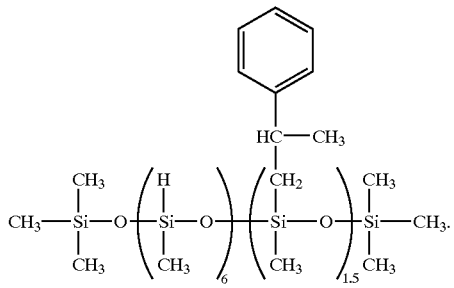

(9)

(C-1) 0.06 weight part of a 10% isopropyl alcohol solution of chloroplatinic acid, (D-1) 10 weight parts carbon black 3030B (made by Mitsubishi Chemical), and 0.04 weight part dimethyl maleate (used as a curing retarder). This mixture was defoamed under reduced pressure (120 minutes at 10 mmHg), and the composition thus obtained was used to cover the above-mentioned shaft. This product was cured by being left for 30 minutes in a 140° C. mold, which produced an elastic layer 2 with a thickness of approximately 5 mm. Also, the same composition as above was packed into an aluminum mold frame that had a thickness of 5 mm and had been lined with a Teflon sheet, after which this mold frame was sandwiched between the hot plates of a pressing machine, and hot press molding was performed for 30 minutes at 140° C., which yielded an evaluational cured sheet with a thickness of 5 mm. The JIS A hardness and shear modulus of this elastic layer 2 sheet are given in Table 1.

Elastic Layer 3

100 weight parts of (A-1) an allyl-terminated oxypropylene polymer (allyl group content: 0.233 mmol/g) with a number average molecular weight Mn of 8500 and a molecular weight distribution of 2 was mixed with (B-3) 2.8 weight parts of a polysiloxane-based curing agent 3 (SiH content: 9.2 mmol/g) expressed by the following Formula 10,

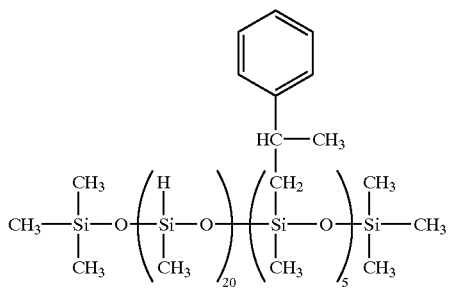

(10)

(C-2) 65 μL of a bis(1,3-divinyl-1,1,3,3-tetramethyldisiloxane) platinum complex catalyst (17.9× 10⁻⁵ mmol/μL, xylene solution), (D-1) 10 weight parts carbon black 3030B (made by Mitsubishi Chemical), and 0.04 weight part dimethyl maleate (used as a curing retarder). This mixture was defoamed under reduced pressure (120 minutes at 10 mmHg), and the composition thus obtained was used to cover the above-mentioned shaft. This product was cured by being left for 30 minutes in a 140° C. mold, which produced an elastic layer 3 with a thickness of approximately 5 mm. Also, the same composition as above was packed into an aluminum mold frame that had a thickness of 5 mm and had been lined with a Teflon sheet, after which this mold frame was sandwiched between the hot plates of a pressing machine, and hot press molding was performed for 30 minutes at 140° C., which yielded an evaluational cured sheet with a thickness of 5 mm. The JIS A hardness and shear modulus of this elastic layer 3 sheet are given in Table 1.

Elastic Layer 4

100 weight parts of (A-1) an allyl-terminated oxypropylene polymer (allyl group content: 0.233 mmol/g) with a number average molecular weight Mn of 8500 and a molecular weight distribution of 2 was mixed with (B-4) 3.4 weight parts of a polysiloxane-based curing agent 4 (SiH content: 7.6 mmol/g) expressed by the following Formula 11,

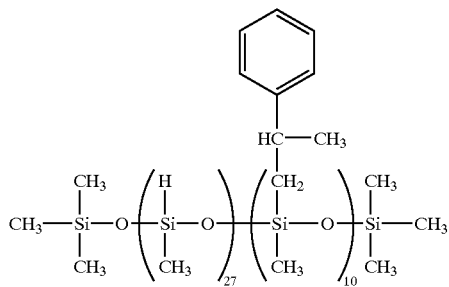

(11)

(C-2) 65 μL of a bis(1,3-divinyl-1,1,3,3-tetramethyldisiloxane) platinum complex catalyst (17.9× 10⁻⁵ mmol/μL, xylene solution), (D-1) 10 weight parts carbon black 3030B (made by Mitsubishi Chemical), and 0.04 weight part dimethyl maleate (used as a curing retarder). This mixture was defoamed under reduced pressure (120 minutes at 10 mmHg), and the composition thus obtained was used to cover the above-mentioned shaft. This product was cured by being left for 30 minutes in a 140° C. mold, which produced an elastic layer 4 with a thickness of approximately 5 mm. Also, the same composition as above was packed into an aluminum mold frame that had a thickness of 5 mm and had been lined with a Teflon sheet, after which this mold frame was sandwiched between the hot plates of a pressing machine, and hot press molding was performed for 30 minutes at 140° C., which yielded an evaluational cured sheet with a thickness of 5 mm. The JIS A hardness and shear modulus of this elastic layer 4 sheet are given in Table 1.

Elastic Layer 5

100 weight parts of (A-2) an allyl-terminated polyisobutylene polymer (allyl group content: 0.20 mmol/g) with a number average molecular weight Mn of 10,000 and a molecular weight distribution of 1.2 was mixed with 50 weight parts of a saturated hydrocarbon-based process oil (used as a plasticizer; PW-380 made by Idemitsu Kosan), (B-3) 4.4 weight parts of the polysiloxane-based curing agent 3 (SiH content: 9.2 mmol/g) expressed by the above Formula 10, (C-2) 56 μL of a bis(1,3-divinyl-1,1,3,3-tetramethyldisiloxane) platinum complex catalyst (17.9× 10⁻⁵ mmol/μL, xylene solution), (D-2) 10 weight parts carbon black (#35G made by Asahi Carbon), and 0.25 weight part 1-ethynyl-1-cyclohexanol (used as a curing retarder). This mixture was defoamed under reduced pressure (120 minutes at 10 mmHg), and the composition thus obtained was used to cover the above-mentioned shaft. This product was cured by being left for 30 minutes in a 150° C. mold, which produced an elastic layer 5 with a thickness of approximately 5 mm. Also, the same composition as above was packed into an aluminum mold frame that had a thickness of 5 mm and had been lined with a Teflon sheet, after which this mold frame was sandwiched between the hot plates of a pressing machine, and hot press molding was performed for 30 minutes at 150° C., which yielded an evaluational cured sheet with a thickness of 5 mm. The JIS A hardness and shear modulus of this elastic layer 5 sheet are given in Table 1.

Elastic Layer 6

100 weight parts of (A-1) an allyl-terminated oxypropylene polymer (allyl group content: 0.233 mmol/g) with a number average molecular weight Mn of 8500 and a molecular weight distribution of 2 was mixed with (B-5) 9.5 weight parts of a polysiloxane-based curing agent 5 (SiH content: 2.7 mmol/g) expressed by the following Formula 12,

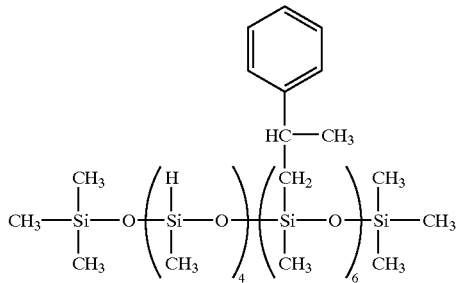

(12)

(C-1) 0.06 weight part of a 10% isopropyl alcohol solution of chloroplatinic acid, (D-1) 10 weight parts carbon black 3030B (made by Mitsubishi Chemical), and 0.04 weight part dimethyl maleate (used as a curing retarder). This mixture was defoamed under reduced pressure (120 minutes at 10 mmHg), and the composition thus obtained was used to cover the above-mentioned shaft. This product was cured by being left for 30 minutes in a 140° C. mold, which produced an elastic layer 6 with a thickness of approximately 5 mm. Also, the same composition as above was packed into an aluminum mold frame that had a thickness of 5 mm and had been lined with a Teflon sheet, after which this mold frame was sandwiched between the hot plates of a pressing machine, and hot press molding was performed for 30 minutes at 140° C., which yielded an evaluational cured sheet with a thickness of 5 mm. The JIS A hardness and shear modulus of this elastic layer 6 sheet are given in Table 1.

Elastic layer 7

100 weight parts of (A-1) an allyl-terminated oxypropylene polymer (allyl group content: 0.233 mmol/g) with a number average molecular weight Mn of 8500 and a molecular weight distribution of 2 was mixed with (B-1) 4.2 weight parts of the polysiloxane-based curing agent 1 (SiH content: 3.9 mmol/g) expressed by the above Formula 8, (C-1) 0.06 weight part of a 10% isopropyl alcohol solution of chloroplatinic acid, (D-1) 10 weight parts carbon black 3030B (made by Mitsubishi Chemical), and 0.04 weight part dimethyl maleate (used as a curing retarder). This mixture was defoamed under reduced pressure (120 minutes at 10 mmHg), and the composition thus obtained was used to cover the above-mentioned shaft. This product was cured by being left for 30 minutes in a 140° C. mold, which produced an elastic layer 7 with a thickness of approximately 5 mm. Also, the same composition as above was packed into an aluminum mold frame that had a thickness of 5 mm and had been lined with a Teflon sheet, after which this mold frame was sandwiched between the hot plates of a pressing machine, and hot press molding was performed for 30 minutes at 140° C., which yielded an evaluational cured sheet with a thickness of 5 mm. The JIS A hardness and shear modulus of this elastic layer 7 sheet are given in Table 1.

Next, the surface layer 1 discussed below was used for the surface layer that covered the outer periphery of the conductive elastic layer.

Surface Layer 1

E-980 (a polycarbonate urethane made by Nippon Miractran) was diluted to 6% with a 1:1 mixed solvent of MEK (methyl ethyl ketone) and DMF (N,N-dimethylformamide), and the surface layer solution thus obtained was used to coat the outside of a conductive elastic layer. This coating was dried for 1 hour at 80° C. and 30 minutes at 140° C., which formed the surface layer 1. A release film was coated with the resin material that makes up this surface layer 1, and the elongation at break was measured by the method set forth in JIS K 6251 and found to be 510%. In this case, the surface layer was applied by dip coating to both the roller and the film, and the coating thickness was approximately 20 μm.

As shown in Table 1, developing rollers and elastic layer sheets were produced by combining the elastic layers 1 to 7 with the surface layer 1 (represented by Examples 1 to 5 and Comparative Examples 1 and 2). The JIS A hardness and shear modulus of the elastic layers in these examples were selected in order to clearly show the difference from the comparative examples, but the present invention is not limited to these hardness and modulus values.

TABLE 1

| | | | Elastic layer sheet | | Surface layer- |
| --- | --- | --- | --- | --- | --- |
| | Elastic layer | Surface layer | JIS A hardness | Shear modulus (Pa) | attached sheet Distortion (μm) |
| Ex. 1 | elastic layer 1 | surface layer 1 | 11 | 4.80E + 05 | 9 |
| Ex. 2 | elastic layer 2 | surface layer 1 | 15 | 5.90E + 05 | 8 |
| Ex. 3 | elastic layer 3 | surface layer 1 | 24 | 7.60E + 05 | 5 |
| Ex. 4 | elastic layer 4 | surface layer 1 | 21 | 7.30E + 05 | 6 |
| Ex. 5 | elastic layer 5 | surface layer 1 | 19 | 6.50E + 05 | 7 |
| C.E. 1 | elastic layer 6 | surface layer 1 | 8 | 3.90E + 05 | 15 |
| C.E. 2 | elastic layer 7 | surface layer 1 | 7 | 3.80E + 05 | 17 |

The JIS A hardness of the elastic layer sheets shown in Table 1 was measured by the method set forth in JIS K 6301 A.

The shear modulus of the elastic layer sheets shown in Table 1 was found as follows. The frequency characteristics from 0.01 Hz to 100 Hz were measured for the elastic modulus in shear mode at 20° C. and 60% RH using a viscoelasticity measurement apparatus (DMS110 made by Seiko Instrument), and the 0.1 Hz shear modulus was found.

The measurement test piece was an elastic layer sample with a thickness of 5 mm and cut to a length of 10 mm and a width of 10 mm from the cured sheet with a thickness of 5 mm produced for evaluational purposes. The measurement test piece can also be a test piece with a thickness of at least 2 mm and cut to a length of 10 mm and a width of 10 mm from the elastic layer of a roller.

The amount of distortion ($\mu$m) in the surface layer-attached sheet in Table 1 was measured as follows. A measurement sheet was separately produced by using a surface layer resin material to coat a cured sheet produced in the same manner as the evaluational sheet of the above-mentioned elastic layer, an SUS disk-shaped jig with a thickness of 10 mm and an outside diameter of 100 mm, and having a circular protrusion (0.5 mm) with a width of 1 mm and an outside diameter of 30 mm in its center, was placed so that this protrusion was in contact with the surface layer of the measurement sheet, a weight of approximately 3 kg was applied from above, and this was left for 24 hours with the above-mentioned circular protrusion pushed into the sheet, after which the weight and the disk jig were removed, and the amount of distortion in the compressed portion after 24 hours was measured.

As is clear from Table 1, the amount of distortion after 24 hours was less than 10 $\mu$m in Examples 1 to 5, whereas this amount was 15 $\mu$m or higher in Comparative Examples 1 and 2, in which the shear modulus of the elastic layer was less than 4.0E+05 Pa ($4.0 \times 10^5$ Pa).

The developing rollers of these examples and comparative examples were each installed in a developing apparatus of the same construction, the developing apparatus was installed in a printer, and a printing test was conducted. The amount of penetration into the roller by the photosensitive element was set to approximately 200 $\mu$m, and the roller was left in this state for 2 weeks in a normal environment of 20° C. and 60% RH, after which the power to the printer was turned on and a printing test was immediately carried out. A sharp image with no streaky density unevenness was obtained immediately after the printer was turned on in Examples 1 to 5, but in Comparative Examples 1 and 2, streaky density unevenness believed to be caused by distortion of the photosensitive element was seen immediately after the printer was turned on, and faint density unevenness still remained 24 hours later.

INDUSTRIAL APPLICABILITY

As discussed above, when a developing roller is used that has a conductive elastic layer having a JIS A hardness of 30° or less and having a shear modulus of at least $4 \times 10^5$ Pa (measured as the viscoelasticity at 0.1 Hz at 20° C. and 60% RH), the proper contact width in the peripheral direction can be ensured between the roller and the photosensitive element even at a low pressing force, and there will be little residual compression strain in the roller even when it has been compressed and fixed in a state of being pressed against the photosensitive element for an extended period. Also, a sharp toner image with no streaky density unevenness attributable to residual strain in the developing roller can be obtained immediately after the compression and fixing are released.

When the roller of the present invention is used as a charging roller, it is possible to supply a charge more uniformly to a photosensitive element because there is so little residual strain, and when the roller of the present invention is used as a transfer roller, it is possible to obtain a sharp transferred image on an intermediate rotating element or recording paper.

What is claimed is:

1. An electrophotography roller, in which a conductive shaft is disposed along a center axis, a conductive elastic layer is provided concentrically around said conductive shaft, and a surface layer is formed concentrically over said conductive elastic layer:

wherein the conductive elastic layer comprises a reaction product of a curable composition whose main components are (A) a polymer that contains at least one alkenyl group in its molecule, and in which the repeating units that make up the main chain consist mainly of oxyalkylene units, (B) a curing agent that contains at least two hydrosilyl groups in its molecule, represented by the following general chemical formula

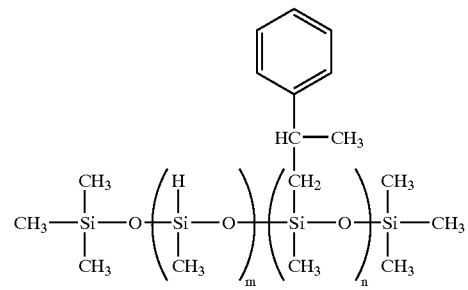

where $2 \leq m+n \leq 50$, $2 \leq m$, and $1 \leq n$, (C) a hydrosilylation catalyst, and (D) a conductivity imparter;

wherein the conductive elastic layer has a JIS A hardness of 30° or less, and the shear modulus of the conductive elastic layer, measured as the viscoelasticity at 0.1 Hz in an environment of 20° C. and 60% RH, is at least $4 \times 10^5$ Pa; and wherein the main component of the surface layer is either a single resin selected from the group consisting of urethane resins, acrylic resins, silicone resins, and fluororesins, or a blend of these resins, and material of the surface layer has an elongation between 300% and 600%.

2. The electrophotography development roller according to claim 1, wherein material of the surface layer has an elongation between 400% and 600%.

3. The electrophotography development roller according to claims 1 or 2, wherein the surface layer is made of urethane resins.

* * * * *

UNITED STATES PATENT AND TRADEMARK OFFICE
CERTIFICATE OF CORRECTION

| | | |
|---|---|---|
| PATENT NO. | : 6,953,421 B2 | Page 1 of 1 |
| APPLICATION NO. | : 10/168037 | |
| DATED | : October 11, 2005 | |
| INVENTOR(S) | : Hidenari Tsunemi et al. | |

It is certified that error appears in the above-identified patent and that said Letters Patent is hereby corrected as shown below:

Column 18, in claim 1, line 10, after "An electrophotography" insert --development--.

Column 18, in claim 1, line 14, delete "$2 \leqq m+n \leqq 50, 2 \leqq m$, and $1 \leqq n$," substitute --$2 \leq m+n \leq 50, 2 \leq m$, and $1 \leq n$, -- in its place.

Signed and Sealed this

Fifth Day of December, 2006

JON W. DUDAS
*Director of the United States Patent and Trademark Office*